US010237366B2

United States Patent
Tulino et al.

(10) Patent No.: US 10,237,366 B2
(45) Date of Patent: Mar. 19, 2019

(54) SYSTEM AND METHOD FOR LIBRARY COMPRESSED CACHE-AIDED CODED MULTICAST

(71) Applicant: Alcatel-Lucent USA Inc., Murray Hill, NJ (US)

(72) Inventors: Antonia Maria Tulino, Lincroft, NJ (US); Jaime Llorca, Red Bank, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 177 days.

(21) Appl. No.: 15/258,497

(22) Filed: Sep. 7, 2016

(65) Prior Publication Data
US 2018/0069942 A1    Mar. 8, 2018

(51) Int. Cl.
*H04L 29/08*     (2006.01)
*G06F 17/30*     (2006.01)
*G06F 3/0481*    (2013.01)

(52) U.S. Cl.
CPC .......... *H04L 67/2842* (2013.01); *H04L 67/06* (2013.01); *G06F 3/04817* (2013.01); *G06F 17/3015* (2013.01)

(58) Field of Classification Search
CPC .......... G06F 17/3015; G06F 17/30153; G06F 17/30156
See application file for complete search history.

(56) References Cited

U.S. PATENT DOCUMENTS

| 2002/0007374 A1 | 1/2002 | Marks et al. |
| 2003/0007498 A1 | 1/2003 | Angle et al. |
| 2007/0168523 A1 | 7/2007 | Jiang et al. |
| 2008/0219269 A1 | 9/2008 | Minkenberg et al. |

(Continued)

FOREIGN PATENT DOCUMENTS

WO    WO-2016/122561 A1    8/2016

OTHER PUBLICATIONS

Cvetkovski et al. "Hyperbolic Embedding and Routing for Dynamic Graphs", 2009, www.cs.bu/edu/faculty/crovella/paper-archive/infocom09-hyperbolic.pdf <http://www.cs.bu/edu/faculty/crovella/paper-archive/infocom09-hyperbolic.pdf>.

(Continued)

*Primary Examiner* — Barbara B Anyan
(74) *Attorney, Agent, or Firm* — Harness, Dickey & Pierce, P.L.C.

(57) ABSTRACT

Data files are transmitted by receiving requests from destination devices for the files and dividing the files into first and second subsets where the files of the second subset are associated with one file of the first subset. The files of the second subset are compressed using one of the files in the first subset as a reference. The compressed files are divided into packets. A portion of the compressed files of the second subset, and a portion of the files of the first subset is cached. Un-cached portions of respective files from the first subset are transmitted to destination devices that have requested these files, and un-cached portions of one particular file from the second subset, and un-cached portions of files in the first subset that are associated with the one particular file, are transmitted to respective destination devices that have requested the particular file from the second subset.

20 Claims, 9 Drawing Sheets

(56) References Cited

U.S. PATENT DOCUMENTS

| | | | |
|---|---|---|---|
| 2010/0274760 A1 | 10/2010 | Diot et al. | |
| 2012/0144438 A1 | 6/2012 | Sayeed | |
| 2013/0007226 A1 | 1/2013 | White et al. | |
| 2013/0246372 A1* | 9/2013 | Rao | G06F 17/3015 707/692 |
| 2014/0165006 A1* | 6/2014 | Chaudhri | G06F 3/04817 715/835 |
| 2015/0207881 A1 | 7/2015 | Tulino et al. | |
| 2015/0207895 A1 | 7/2015 | Tulino et al. | |
| 2015/0207896 A1 | 7/2015 | Llorca et al. | |
| 2015/0207903 A1 | 7/2015 | Tulino et al. | |

OTHER PUBLICATIONS

Cacciapuoti et al., "Speeding up Future Video Distribution via Channel-Aware Caching-Aided Coded Multicast", May 2016. https://ar:xiv.org/pdf/1605.05026.pdf.

PCT Communication dated Nov. 20, 2017 in related International Application No. PCT/US2017/050256.

M. Maddah-Ali, et al., "Fundamental Limits of Caching," *Proceedings IEEE International Symposium on Information Theory (ISIT)*, 2013, pp. 1077-1081.

M. Maddah-Ali, et al., "Decentralized Coded Caching Attains Order-Optimal Memory-Rate Tradeoff," *IEEE/ACM Transactions on Networking*, (99):1-8, 2014.

M. Ji, et al., "On the Average Performance of Caching and Coded Multicasting with Random Demands," *11th International Symposium on Wireless Communications Systems (ISWCS)*, 2014, pp. 922-926.

M. Ji, et al., "Caching and Coded Multicasting: Multiple Groupcast Index Coding," *IEEE, GlobalSIP*, 2014, pp. 881-885.

M. Ji, et al., "Order-Optimal Rate of Caching and Coded Multicasting with Random Demands," *arXiv*, 1502.03124, 2015.

M. Ji, et al., "Caching-Aided Coded Multicasting with Multiple Random Requests," *IEEE, Information Theory Workshop (ITW)*, 2014.

J. Llorca, et al., "Network-Coded Caching-Aided Multicast for Efficient Content Delivery," Proceedings IEEE International Conference on Communications (ICC), 2013, pp. 3557-3562.

R. Timo, et al., "A Rate-Distortion Approach to Caching," *preprint* http://roytimo.wordpress.com/pub, 2015.

\* cited by examiner

SYSTEM AND METHOD FOR LIBRARY COMPRESSED CACHE-AIDED CODED MULTICAST

BACKGROUND OF THE INVENTION

Field of the Invention

Example embodiments relate generally to a system and method for designing correlation-aware distributed caching and coded delivery in a content distribution network (CDN) in order to reduce a network load.

Related Art

Content distribution networks (CDNs) face capacity and efficiency issues associated with an increase in popularity of on-demand audio/video streaming. One way to address these issues is through network caching and network coding. For example, conventional content distribution network (CDN) solutions employ algorithms for the placement of content copies among caching locations within the network. Conventional solutions also include cache replacement policies such as LRU (least recently used) or LFU (least frequently used) to locally manage distributed caches in order to improve cache hit ratios. Other conventional solutions use random linear network coding to transfer packets in groups, which may improve throughput in capacity-limited networks.

However, conventional network caching and network coding solutions do not consider the relative efficiency of caching and transmission resources. Moreover, conventional content delivery solutions do not exploit the possible combined benefits of network caching and network coding.

Recent studies have shown that, in a cache-aided network, exploiting globally cached information in order to multicast coded messages that are useful to a large number of receivers yields overall network throughput that is proportional to the aggregate cache size. In this context, each file in the library is treated as an independent piece of information, compressed up to its entropy. During the caching phase, parts of the library files are cached at the receivers according to a properly designed caching distribution. The delivery phase consists of computing an index code, in which the sender compresses the set of requested files into a multicast codeword, only exploring perfect matches ("correlation one") among (parts of) the requested and the cached files, ignoring all other correlations that exist among the different (parts of) files. The fundamental rate-memory trade-off in a broadcast caching network has been studied in the following five broadcast caching network documents that are hereby incorporated by reference in their entirety: M. Maddah-Ali, U. Niesen, "Fundamental limits of caching" in IEEE Transactions on Information Theory, 2014; M. Maddah-Ali, U. Niesen, "Decentralized coded caching attains order-optimal memory-rate tradeoff" in IEEE Transactions on Networking, 2014; M. Ji, A. M. Tulino, J. Llorca, and G. Caire, "On the average performance of caching and coded multicasting with random demands," 11*th International Symposium on Wireless Communications Systems* (*ISWCS*), pages 922-926 (2014); M. Ji, A. M. Tulino, J. Llorca, and G. Caire, "Caching and coded multicasting: Multiple groupcast index coding," in *GlobalSIP*, 2014, pages 881-885, IEEE (2014); M. Ji, A. M. Tulino, J. Llorca, and G. Caire, "Order-optimal rate of caching and coded multicasting with random demands," arXiv:1502.03124 (2015); and M. Ji, A. M. Tulino, J. Llorca, and G. Caire, "Caching-Aided Coded Multicasting with Multiple Random Requests," in *Information Theory Workshop* (*ITW*), 2015, IEEE (2014).

While the initial results proposed in broadcast caching network documents (cited above) are promising, these studies consider the network content as independent pieces of information, and the studies do not account for the additional potential gains arising from further compression of correlated content distributed across the network. Based on these previous studies, gains may be made in exploring correlations among the library content in both caching and delivery phases.

SUMMARY OF INVENTION

At least one embodiment is directed toward a method of transmitting a plurality of data files in a network.

In one embodiment, the method includes receiving, by at least one processor of a network node, requests from destination devices for files of the plurality of data files; dividing, by the at least one processor, the files into one of a first subset of files, and a second subset of files, each of the files of the second subset of files being associated with one file of the first subset of files; compressing, by the at least one processor, each of the files of the second subset of files using one of the files in the first subset of files as a reference; dividing, by the at least one processor, the compressed files of the second subset of files and the files of the first subset into packets; caching, by the at least one processor, a portion of the compressed files of the second subset of files, and at least a portion of the files of the first subset of files; transmitting, by the at least one processor, un-cached portions of respective files from the first subset of files to respective destination devices that have requested these files; and transmitting, by the at least one processor, un-cached portions of one particular file from the second subset of files, and un-cached portions of files in the first subset of files that are associated with the one particular file, to respective destination devices that have requested the one particular file from the second subset of files.

In one embodiment, the dividing of the files into one of the first subset of files and the second subset of files includes, determining correlations between each of the files of the plurality of data files, the plurality of data files being contained in a file library; computing an aggregate popularity for each of the plurality of data files; selecting a first file, of the plurality of data files, with a highest aggregate popularity; assigning the first file to the first subset of files; assigning at least a second file, of the plurality of data files, to the second subset of files, the at least a second file being correlated with the first file; eliminating the first file and the at least a second file from the file library; and repeating the determining, computing, selecting, assigning and eliminating steps to assign successively lower aggregately popular files to the respective first subset of files and second subset of files.

In one embodiment, the compressing each of the files of the second subset of files using one of the files in the first subset as a reference includes, inter-compressing each of the files of the second subset of files using information on the aggregate popularity for each of the plurality of data files and a joint probability distribution of the plurality of files.

In one embodiment, the dividing of the compressed files of the second subset of files and the files of the first subset in packets includes ensuring that the packets are each equal in size.

In one embodiment, the transmitting steps further include, building a multicast codeword by, receiving a file level demand vector, building an extended file level demand vector that includes files of the first subset of files requested by the destination devices, the files of the second subset of files requested by the destination devices, and files of the first subset of files that are associated with the requested files of the second subset of files, building an extended packet level demand vector that includes un-cached portions of files contained in the extended file level demand vector, building a conflict graph including user demand represented by the extended file level user demand, coloring the conflict graph, building the multicast codeword using the colored conflict graph, and transmitting the respective un-cached files of the first and second subset of files using the multicast codeword.

In one embodiment, the at least one processor is a processor of a transmitter.

In one embodiment, the transmitter is a base station.

In one embodiment, the aggregate popularity includes a probability that a destination device requests a particular file of the plurality of files.

In one embodiment, the aggregate popularity includes a probability that a destination device requests at least one file correlated with the particular file.

At least another embodiment is directed toward a non-transitory computer-readable medium having a program including instructions for causing the at least one processor of the network node to perform the method.

At least another embodiment is directed toward a device having a non-transitory computer-readable medium with a program including instructions for configuring at least one processor to perform a method of transmitting a plurality of data files in a network.

In one embodiment, the method includes receiving, by the at least one processor, requests from destination devices for files of the plurality of data files; dividing, by the at least one processor, the files into one of a first subset of files, and a second subset of files, each of the files of the second subset of files being associated with one file of the first subset of files; compressing, by the at least one processor, each of the files of the second subset of files using one of the files in the first subset of files as a reference; dividing, by the at least one processor, the compressed files of the second subset of files and the files of the first subset into packets; caching, by the at least one processor, a portion of the compressed files of the second subset of files, and at least a portion of the files of the first subset of files; transmitting, by the at least one processor, un-cached portions of respective files from the first subset of files to respective destination devices that have requested these files; and transmitting, by the at least one processor, un-cached portions of one particular file from the second subset of files, and un-cached portions of files in the first subset of files that are associated with the one particular file, to respective destination devices that have requested the one particular file from the second subset of files.

At least one embodiment is directed toward a network node.

In one embodiment, the network node includes a processor configured to, receive requests from destination devices for files of a plurality of data files, divide the files into one of a first subset of files, and a second subset of files, each of the files of the second subset of files being associated with one file of the first subset of files, compress each of the files of the second subset of files using one of the files in the first subset of files as a reference, divide the compressed files of the second subset of files and the files of the first subset into packets, cache a portion of the compressed files of the second subset of files, and at least a portion of the files of the first subset of files, transmit un-cached portions of respective files from the first subset of files to respective destination devices that have requested these files, and transmit un-cached portions of one particular file from the second subset of files, and un-cached portions of files in the first subset of files that are associated with the one particular file, to respective destination devices that have requested the one particular file from the second subset of files.

In one embodiment, the dividing of the files into one of the first subset of files and the second subset of files is accomplished by the at least one being further configured to, determine correlations between each of the files of the plurality of data files, the plurality of data files being contained in a file library, compute an aggregate popularity for each of the plurality of data files, select a first file, of the plurality of data files, with a highest aggregate popularity; assign the first file to the first subset of files, assign at least a second file, of the plurality of data files, to the second subset of files, the at least a second file being correlated with the first file, eliminate the first file and the at least a second file from the file library, and repeat the determining, computing, selecting, assigning and eliminating steps to assign successively lower aggregately popular files to the respective first subset of files and second subset of files.

In one embodiment, the compressing each of the files of the second subset of files using one of the files in the first subset as a reference is accomplished by the at least one processor being further configured to, inter-compress each of the files of the second subset of files using information on the aggregate popularity for each of the plurality of data files and a joint probability distribution of the plurality of files.

In one embodiment, the dividing of the compressed files of the second subset of files and the files of the first subset in packets includes the at least one processor being further configured to ensure that the packets are each equal in size.

In one embodiment, the transmitting steps are accomplished by the at least one processor being further configured to, build a multicast codeword by, receive a file level demand vector, build an extended file level demand vector that includes files of the first subset of files requested by the destination devices, the files of the second subset of files requested by the destination devices, and files of the first subset of files that are associated with the requested files of the second subset of files, build an extended packet level demand vector that includes un-cached portions of files contained in the extended file level demand vector, build a conflict graph including user demand represented by the extended file level user demand, color the conflict graph, build the multicast codeword using the colored conflict graph, and transmit the respective un-cached files of the first and second subset of files using the multicast codeword.

In one embodiment, the at least one processor is a processor of a transmitter.

In one embodiment, the transmitter is a base station.

In one embodiment, the aggregate popularity includes a probability that a destination device requests a particular file of the plurality of files.

In one embodiment, the aggregate popularity includes a probability that a destination device requests at least one file correlated with the particular file.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted

DETAILED DESCRIPTION

Figure 1:
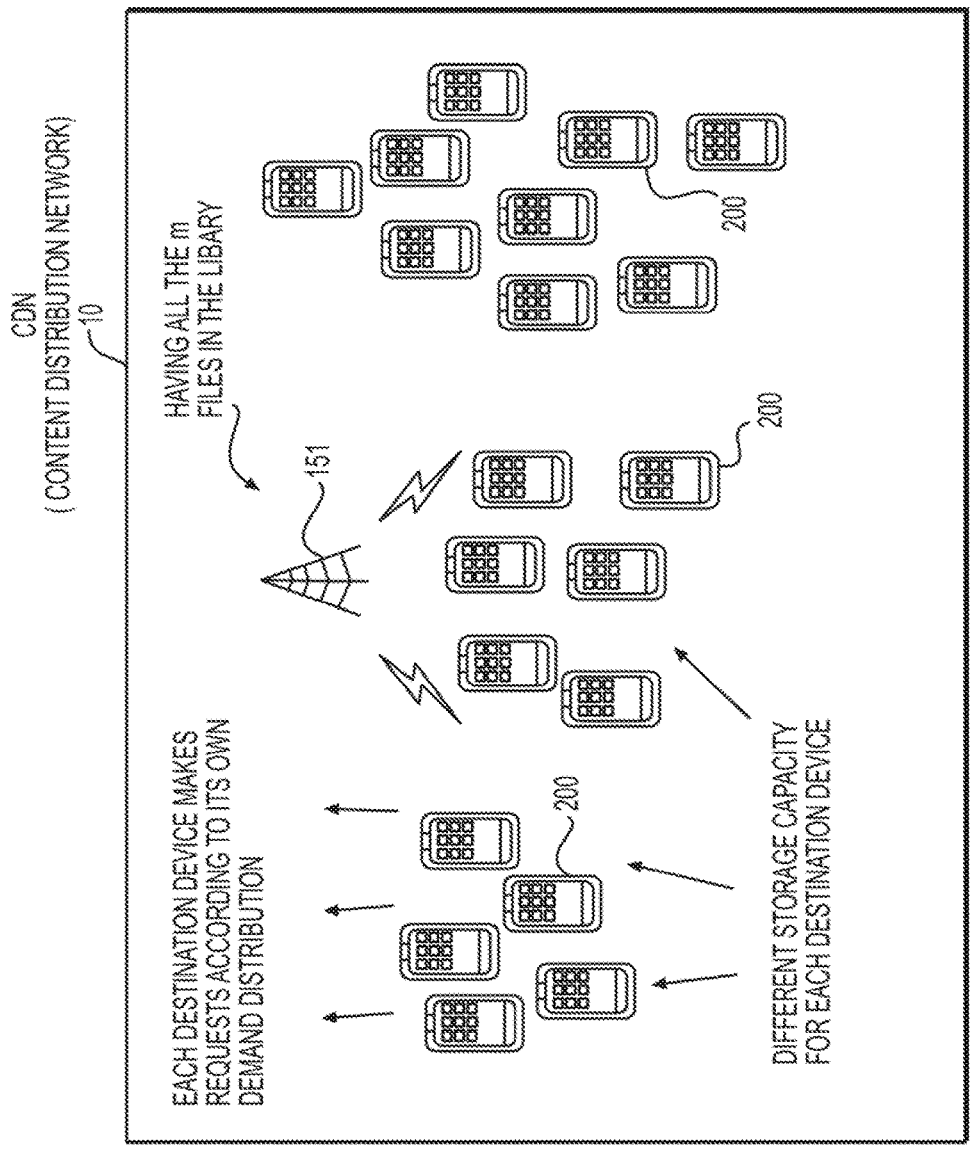
FIG. 1 illustrates a content distribution network, in accordance with an example embodiment.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

FIG. 1 illustrates a content distribution network, according to an example embodiment.

As shown in FIG. 1, a content distribution network (CDN) may include a network element 151 connected to a plurality of destination devices 200. The network element 151 may be a content source (e.g., a multicast source) for distributing data files (such as movie files, for example). The destination devices 200 may be end user devices requesting data from the content source. For example, each destination device 200 may be part of or associated with a device that allows for the user to access the requested data. For example, each destination device 200 may be a set top box, a personal computer, a tablet, a mobile phone, or any other device associated used for streaming audio and video. Each of the destination devices 200 may include a memory for storing data received from the network element 151. The structure and operation of the network element 151 and destination devices 200 will be described in more detail below with reference to FIGS. 2 and 3.

Figure 2:
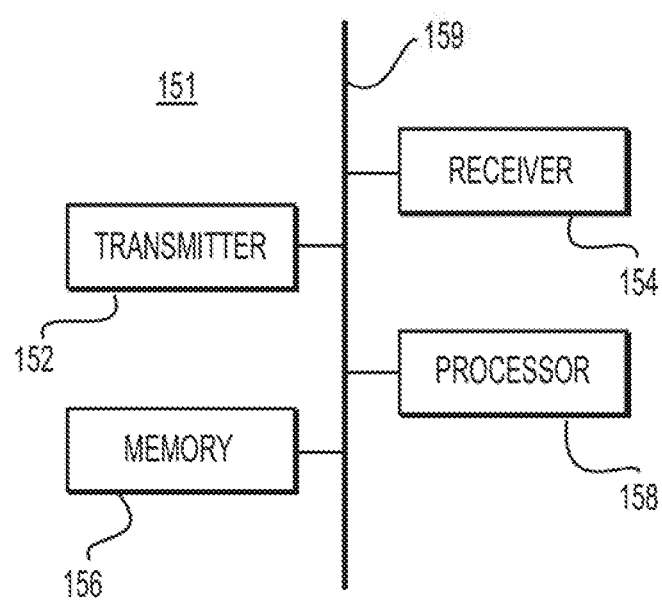
FIG. 2 is a diagram illustrating an example structure of a network element, in accordance with an example embodiment.
Figure 3:
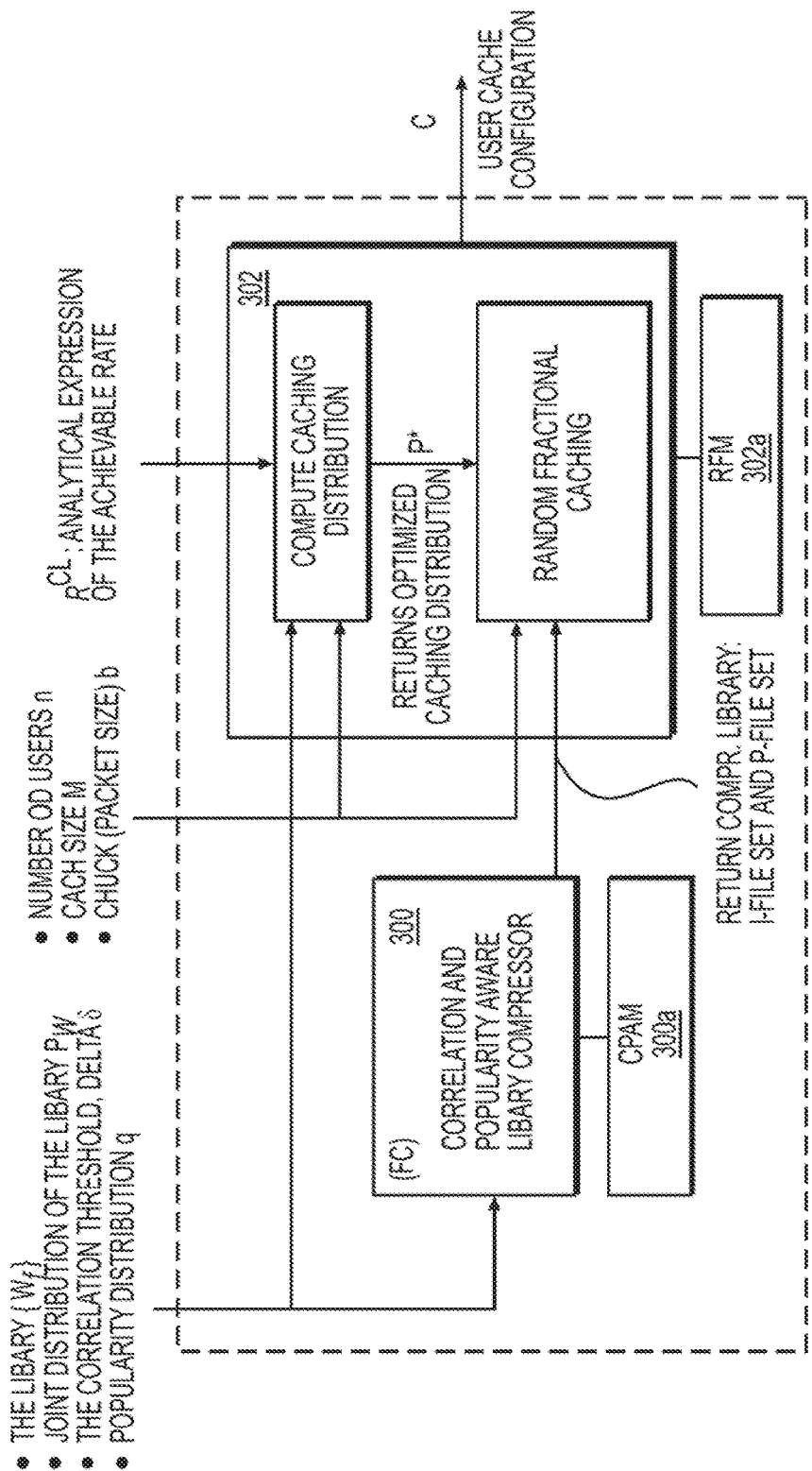
FIG. 3 illustrates a Correlation-and-Popularity-Aware Library Compressor and Random Fractional Cache Encoder, in accordance with an example embodiment.

FIG. 2 is a diagram illustrating an example structure of a network element 151 according to an example embodiment. According to at least one example embodiment, the network element 151 may be configured for use in a communications network (e.g., the content distribution network (CDN) of FIG. 1). Referring to FIG. 2, the network element 151 may include, for example, a data bus 159, a transmitter 152, a receiver 154, a memory 156, and a processor 158. Although a separate description is not included here for the sake of brevity, it should be understood that each destination device 200 may have the same or similar structure as the network element 151.

The transmitter 152, receiver 154, memory 156, and processor 158 may send data to and/or receive data from one another using the data bus 159. The transmitter 152 may be a device that includes hardware and any necessary software for transmitting wireless signals including, for example, data signals, control signals, and signal strength/quality information via one or more wireless connections to other network elements in a communications network.

The receiver 154 may be a device that includes hardware and any necessary software for receiving wireless signals including, for example, data signals, control signals, and signal strength/quality information via one or more wireless connections to other network elements in a communications network.

The memory 156 may be any device or structure capable of storing data including magnetic storage, flash storage, etc.

The processor 158 may be any device capable of processing data including, for example, a special purpose processor configured to carry out specific operations based on input data, or capable of executing instructions included in computer readable code. For example, it should be understood that the modifications and methods described below may be stored on the memory 156 and implemented by the processor 158 within network element 151.

Further, it should be understood that the below modifications and methods may be carried out by one or more of the above described elements of the network element 151. For example, the receiver 154 may carry out steps of "receiving," "acquiring," and the like; transmitter 152 may carry out steps of "transmitting," "outputting," "sending" and the like; processor 158 may carry out steps of "determining," "generating", "correlating," "calculating," and the like; and memory 156 may carry out steps of "storing," "saving," and the like.

General Methodology:

Some example embodiments are directed toward designing a correlation-aware scheme which may consist of the receivers 200 storing content pieces based on a popularity of the content pieces, as well as on their correlation with the rest of the library in the caching phase, and receiving compressed versions of the requested files according to the information distributed across the network 10 and their joint statistics during a delivery phase.

A proposed correlation-aware caching scheme, termed a "LIBRARY COMPRESSED CACHE-AIDED CODED MULTICAST (COMP-CACM)," may include a library compression step proceeding correlation-aware versions of the caching and delivery phases, as described in at least these two patent documents that are hereby incorporated by reference in their entirety: U.S. pub. app. 2015/0207881, "Devices and Methods for Network-Coded and Caching-Aided Content Distribution," by Antonia Tulino, et al; and U.S. pub. app. 2015/0207896, "Devices and Methods for Content Distribution in a Communications Network," by Jaime Llorca, et al.

Figure 4:
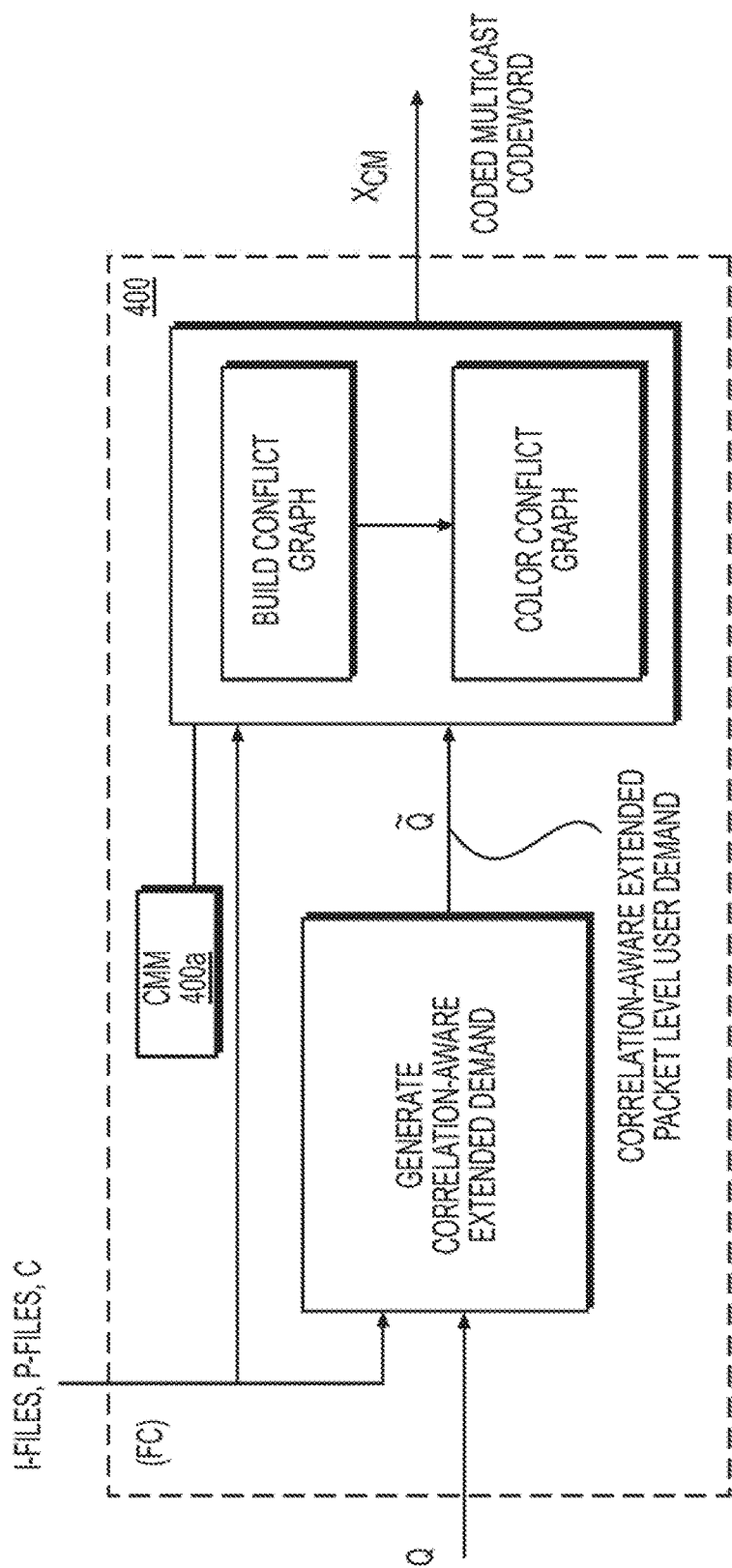
FIG. 4 illustrates a Coded Multicast Encoder/Decoder, in accordance with an example embodiment.
Figure 5:
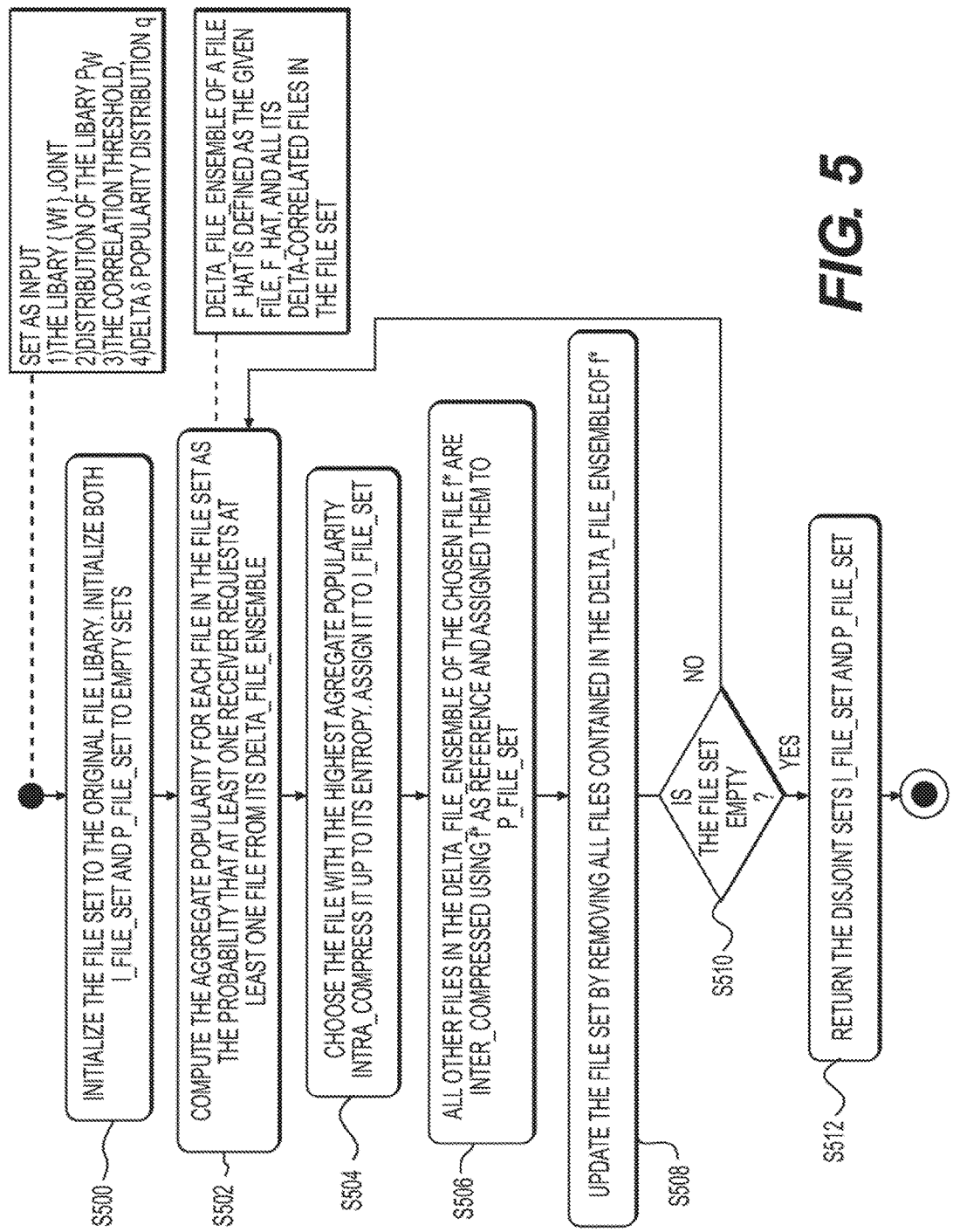
FIG. 5 is a flowchart illustrating a correlation and popularity aware compression method needed for reducing an original library to a library composed of inter-compressed files that may be performed by a Correlation-and-Popularity-Aware Library Compressor, in accordance with an example embodiment.
Figure 6:
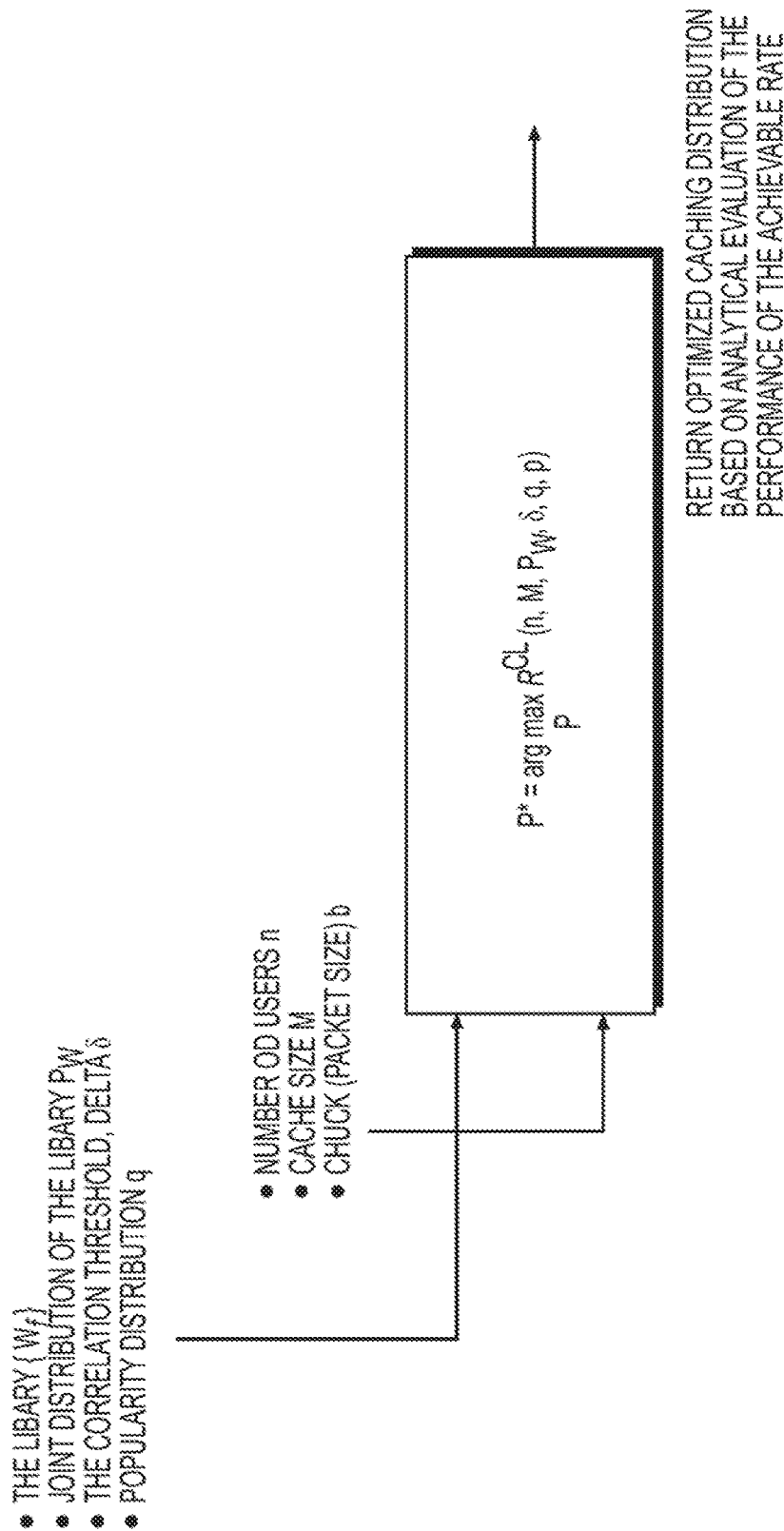
FIG. 6 is a method of computing a caching distribution for the compressed library that may be performed by a Random Fractional Cache Encoder, in accordance with an example embodiment.
Figure 7:
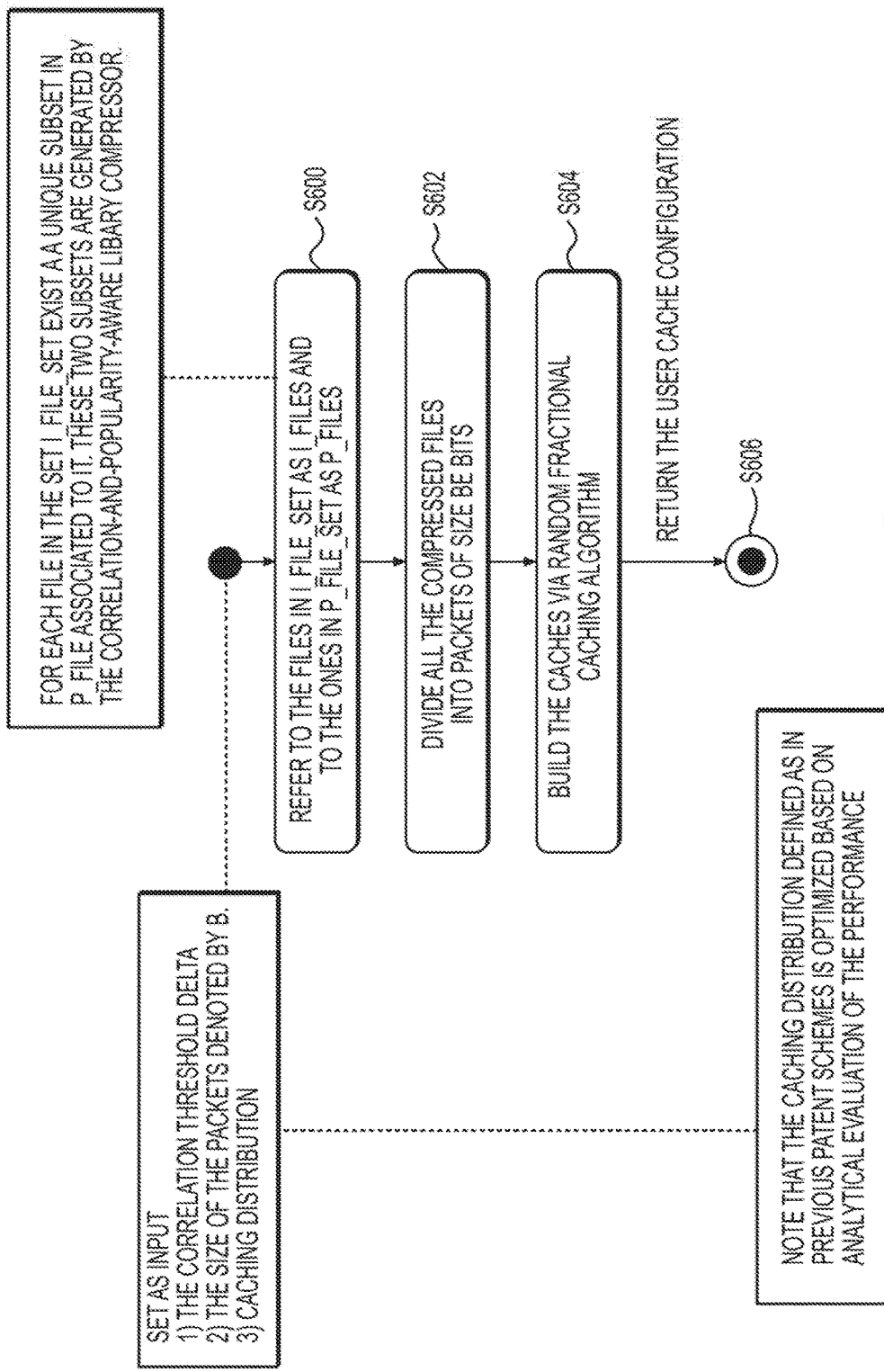
FIG. 7 is a flowchart illustrating a compressed library placement phase that may be performed by a Random Fractional Cache Encoder, in accordance with an example embodiment.

The Comp-CACM method may be performed by a processor 158 of a network element 151, where the processor 158 may cause a Correlation-and-Popularity-Aware Library Compressor 300 (FIG. 3), and a Random Fractional Cache Encoder 302 (FIG. 3) to perform the functions of the respective methods shown in FIGS. 5, 6 and 7. Specifically, the compressor 300 and encoder 302 may exist within the processor 158 of the network element 151. Or, alternatively, the network element 151 may include a separate dedicated processor, aside from a main processor 158, where the compressor 300 and encoder 302 may reside in the separate dedicated processor within the network element 151. The Comp-CACM example method may further include a Coded Multicast Encoder 400 (FIG. 4) to perform the functions of the method shown in FIG. 9. Specifically, the encoder 400 may exist within the processor 158 of the destination device 200. Or, alternatively, the network element 151 may include a separate dedicated processor, aside from a main processor 158, where the encoder 400 may reside in the separate dedicated processor within the destination device 200.

In the Comp-CACM method of some example embodiments, the following major steps may be performed by the respective processors 158, where these major steps may include the following.

Major Step 1: The library files may be divided into two subsets, I-files and P-files by the processor 158, where each P-file is associated to one I-file.

Major Step 2: The P-files may be conditionally compressed with respect to the I-files by the compressor.

Major Step 3: The compressed files may be divided into packets by the processor 158, and a portion of these packets may be cached at each receiver 200 according to a caching distribution.

Major Step 4: During the delivery phase, the processors 158 of respective receivers 200 requesting an I-file may receive a linear combination of the un-cached packets of the requested I-file, and the processors 158 of the receivers 200 requesting a P-file may receive a linear combination of the un-cached packets of the requested P-file and its associated I-file.

Differently from conventional correlation-unaware schemes, processors 158 may cause the cache encoder 302 of the example embodiments to operate on a compressed version of the library obtained by the Correlation-and-Popularity-Aware Library Compressor 300. Even though the delivery phase may be based on computing an index code, this phase may be modified to account for the content stored in the receiver 200 caches (memory 156) in a compressed version of the library files.

In Steps 1 and 2, prior to passing the library to the cache encoder 300, the correlations among the library content may be exploited to compress the files according to a joint distribution $P_W$ as well a popularity of the files, resulting in a library composed of inter-compressed files.

After compressing the library (in Step 3), example embodiments may use a modified the random fractional cache encoder 302 for the compressed library, as disclosed in the following patent documents: U.S. pub. app. 2015/0207881, "Devices and Methods for Network-Coded and Caching-Aided Content Distribution," by Antonia Tulino, et al; and U.S. pub. app. 2015/0207896, "Devices and Methods for Content Distribution in a Communications Network," by Jaime Llorca, et al.

It is noted that steps 1, 2 and 3 may be referred to as a "compressed library placement phase" (see FIG. 1), and step 4 may be referred to as a "compressed library delivery phase."

Problem Formulation:

In a broadcast caching network with one sender (a network element 151, such as a base station, for instance) connected to n receivers (i.e., destination devices 200), $U=\{1, \ldots, n\}$ via a shared error-free multicast link. The processor 158 of sender 151 may access a file library $F=\{1, \ldots, m\}$ composed of m files, each of entropy F bits, and the processor 158 of each receiver 200 may have a cache of size MF bits. The processors 158 of receivers 200 may request files in an independent and identically distributed (i.i.d.) manner according to a demand distribution $q=(q_1, \ldots, q_m)$, where $q_f$ denotes a probability of requesting file $f \in F$. The file library may be represented by a set of random binary vectors of length $L \geq F$, $\{W_f \in F_2^L : f \in F\}$, whose realization is denoted by $\{W_f : f \in F\}$. Content files may be correlated, i.e., $H(W_{f_i}|W_{f_j}) \leq F$, $\forall f_i, f_j \in F$, and $H(W_1, \ldots, W_m) \leq mF$. Such correlations may be especially relevant among content files of a same category, such as episodes of a same TV show or a same-sporting event recording, which, even if personalized, may share common backgrounds and scene objects. Hence, the joint distribution of the library files, denoted by $P_F$, may not necessarily be the product of the file marginal distributions.

Network operations may generally occur in two major phases: 1) placement phase taking place at network setup, in which caches may be populated with content from the library, and 2) a delivery phase where the network may be used repeatedly in order to satisfy receiver 200 demands. A design of the caching and delivery phases forms may be jointly referred to as a "caching scheme."

A goal of some of the example embodiments is to enjoy added gains that can be obtained by exploring the correlations among the library content, in both caching and delivery phases. To that end, a multiple cache scenario may be used to use correlation-aware lossless reconstruction. The caching phase may allow for placement of arbitrary functions of a correlated library at the receivers 200, while the delivery phase may become equivalent to a source coding problem with distributed side information. A correlation-aware scheme may then consist of the processors 158 of receivers 200 storing content pieces based on a popularity as well as on their correlation with the rest of the file library in the caching phase, and receiving compressed versions of the requested files may be accomplished according to information distributed across the network and joint statistics during the delivery phase.

Theoretic Problem Formulation:

The term $\{A_i\}$ may denote a set of elements $\{A_i : i \in I\}$, with being I the domain of index i. Using this notation, the following information-theoretic formulation of a caching scheme may be utilized, where initially a realization of the library $\{W_f\}$ may be revealed to the sender.

Cache Encoder 302:

At the sender 151, the processor 158 may cause the cache encoder 302 to compute a content to be placed at the memory 156 (cache) of the receiver 200 by using a set of functions $\{Z_u : F_2^{mL} \to F_2^{MF} : u \in U\}$, such that $Z_u(\{W_f\})$ may be the content cached at receiver u. A cache configuration $\{Z_u\}$ may be designed jointly across receivers, taking into account global system knowledge such as the number of receivers and their cache sizes, the number of files, their aggregate popularity, and their joint distribution $P_F$. Computing $\{Z_u\}$ and populating the receiver caches may constitute a "caching phase," which may be assumed to occur during off-peak hours without consuming actual delivery rate.

Multicast Encoder 400: Once the caches 156 may be populated, the network may be repeatedly used for different demand realizations. At each use of the network, a random demand vector $f=(f_1, \ldots, f_n) \in F^n$ may be revealed to the sender 151. Term f may have i.i.d components distributed according to q, where $f=(f_1, \ldots, f_n)$. A multicast encoder may be defined by a fixed-to-variable encoding function $X: F^n \times F_2^{mL} \times F_2^{nMF} \to F_2^*$ (where $F_2^*$ may denote a set of finite length binary sequences), such that $X(f, \{W_f\}, \{Z_u\})$ may be a transmitted codeword generated according to demand realization f, library realization $\{W_f\}$, cache configuration $\{Z_u\}$, and joint file distribution $P_F$.

Multicast Decoders 400: The processor 158 of each receiver $u \in U$ may recover a requested file $W_{f_u}$ using the received multicast codeword and its cached codeword, as $$\hat{W}_{f_u} = \lambda_u(f, X, Z_u),$$ where $\lambda_u : F^n \times F^*_2 \times F_2^{MF} \to F_2^L$ denotes the decoding function of receiver u.

The worst-case (over the file library) probability of error of the corresponding caching scheme may be defined as follows.

$$P_e^{(F)} = \sup_{\{W_f : f \in F\}} P(\hat{W}_{f_u} \neq W_{f_u}).$$

An (average) rate of an overall caching scheme may be defined as follows.

$$R^{(F)} = \sup_{\{W_f : f \in F\}} \frac{E[J(X)]}{F}. \qquad \text{Equation 1}$$

Where J(X) denotes the length (in bits) of the multicast codeword X.

Definition 1: A rate-memory pair (R,M) may be achievable if there exists a sequence of caching schemes for cache capacity (memory) M and increasing file size F such that $\lim_{F \to \infty} P_e^{(F)} = 0$, and $\limsup_{F \to \infty} R^{(F)} \leq R$.

Definition 2: The rate-memory region may be the closure of the set of achievable rate-memory pairs (R,M). The rate-memory function R(M) may be the infimum of all rates R such that (R,M) is in the rate-memory region for memory M.

A lower bound and an upper bound may be found on the rate-memory function R(M), given in Theorems 1 and 2 respectively, and design a caching scheme (i.e., a cache encoder and a multicast encoder, and multicast decoder) that may result in an achievable rate R close to the lower bound.

Lower Bound:

In this section, a lower bound may be derived on the rate-memory function under uniform demand distribution using a cut-set bound argument on the caching-demand augmented graph associated with the broadcast caching network. To this end let $D^{(j)}$ may denote the set of demands with exactly j distinct requests.

Theorem 1: For a broadcast caching network with n receivers, library size m, uniform demand distribution, and joint probability $P_W$, $$R(M) \geq \liminf_{F \to \infty} \max_{\ell \in \{1, \ldots, \gamma\}} P_\ell \frac{[0.9][H(\{W_f : f \in F\}) - \ell MF]^+}{\lfloor \frac{m}{\ell} \rfloor F}$$

Where $\gamma = \min\{n, m\}$, $P_\ell = P(d \in \cup_{f \geq \ell} D^{(j)})$ and $H(\{W_f : f \in F\})$ may be the entropy of the entire library.

Correlation-and-Popularity-Aware Library Compressor 300:

In the major steps 1 and 2 (above), prior to passing the library to the cache encoder 302, the correlations among the library content may be exploited to compress the files according to their joint distribution $P_W$ as well as their popularity, resulting in a library composed of inter-compressed files.

Definition 3 ($\delta$-Correlated Files): For a given threshold $\delta \leq 1$ and file size F, file $W_f$ may be $\delta$-correlated with file $W_{f'}$ if $H(W_f, W_{f'}) \leq (1+\delta)F$ bits.

Using the $\delta$-correlated files, the file library $F = F_I \cup F_P$ may be partitioned into I-files $F_I$, and inter-compressed P-files $F_P$, as shown in FIG. 5 (described below).

FIG. 5 illustrates a flowchart of a correlation and popularity aware compression method for reducing an original library to a library composed of inter-compressed files that may be performed by the processor 158 of the sender 151 that may cause the Correlation-and-Popularity-Aware Library Compressor 300 to perform the following steps (below), in accordance with an example embodiment. In particular, the processor 158 may include a Correlation and Popularity Aware Module (CPAM) 300a that may provide the processor 158 with the instructions to cause the processor 158 to command the compressor 300 to perform the method steps shown in FIG. 5 and described below.

Compressor Step 1. The processor 158 of the sender 151 may cause the compressor 300 to initialize the file set to the original library F (step S500 of FIG. 5).

Compressor Step 2. The processor 158 may cause the compressor 300 to compute an aggregate popularity for each file in the file set as the probability that at least one receiver requests at least one file from its $\delta$-file-ensemble, defined as the given file and all its $\delta$-correlated files in the file set (step S502).

Compressor Step 3. The processor 158 may choose the file with the highest aggregate popularity, $W_{f^*}$, and assign it to the I-file set $F_I \subseteq F$ (step S504). All other files in the $\delta$-file-ensemble of $W_{f^*}$ may be inter-compressed using $W_{f^*}$ as reference and assigned to the P-file set $F_P \subseteq F$ (step S506).

Compressor Step 4. The processor 158 may update the file set by removing all files contained in the $\delta$-file-ensemble of $W_{f^*}$ (step S508).

Compressor Step 5. The processor 158 may determine if the file set is empty (in step S510). And, in this regard, the processor 158 may repeat steps S502 to S508 of FIG. 5 until the file set is empty. In step S512, the processor 158 may return the disjoint I-file and P-file sets.

The partitioning procedure described above may result in a compressed library, $\{\overline{W}_f : f \in F\}$, composed of I-files $F_I$ each with entropy F, and P-files $F_P$ inter-compressed with respect to their corresponding I-files, with conditional entropy less than $\delta F$. The value of $\delta$ maybe be further optimized as a function of system parameters $(n, m, M, q, P_W)$ in order to minimize an (average) rate of the overall proposed caching scheme, given in Equation 1 (above).

The following example illustrates the compression of the library for a simple example system setup.

Example 1

Assuming a library consisting of m=4 uniformly popular files $\{W_1, W_2, W_3, W_4\}$ each with entropy F bits. The file pairs $\{W_1, W_2\}$ and $\{W_3, W_4\}$ may be assumed to be independent, while correlations may exist between $W_1$ and $W_2$, and between $W_3$ and $W_4$. Specifically, $H(W_1|W_2) = H(W_2|W_1) = F/4$ and $H(W_3|W_4) = H(W_4|W_3) = F/4$. Since files may be equally popular and each file may be correlated with one other file, each file has the same aggregate popularity. File $W_2$ may be chosen as the first I-file, and assigned its $\delta$-correlated file, $W_1$, to the P-file set. The file set may then be updated to $\{W_3,W_4\}$. Again, either file may be assigned to the I-file set as they have the same aggregate popularity. $W_4$ may be chosen as the second I-file and assigned $W_3$ to the P-file set. This may result in the compressed library $\{\overline{W}_f\}=\{\overline{W}_1,\overline{W}_2,\overline{W}_3,\overline{W}_4\}$ with $F_I=\{2,4\}$ and $F_P=\{1,3\}$. $\overline{W}_1$ ($\overline{W}_3$) may denote P-file $W_1(W_3)$ inter-compressed with respect to I-file $W_2(W_4)$.

Random Fractional Cache Encoder 302:

After compressing the library, in Major Step 3, an embodiment of the Comp-CACM method may utilize a random fractional cache encoder 302 for the compressed library.

Specifically, given the compressed library $\{\overline{W}_f\}$, the processor 158 of the sender 151 may cause the cache encoder 302 to divide each file into equal-size packets, such that each file $\overline{W}_f$ may be divided into $H(\overline{W}_f)/b \in \mathbb{N}$ packets of length b bits. The packet length b may be chosen such that all files in the compressed library (of possibly different lengths) may be divided into an integer number of packets. The network element 151 may then populate the caches by randomly selecting and storing $p_f M$ fraction of the packets of each file $\overline{W}_f$, $f \in F$ at each receiver 200, where $p=(p_1,\ldots,p_m)$, referred to as the caching distribution, is a vector with elements $0 \leq p_f \leq 1/M$, satisfying the cache constraint as $\Sigma_{f \in F_I} p_f + \delta \Sigma_{f \in F_P} p_f = 1$.[1]

The caching distribution may optimally be designed to minimize the rate of the corresponding correlation-aware delivery scheme as expressed in Equation 1 (above) while taking into account global system parameters (n, m, M, q, $P_W$).

FIG. 6 is a method of computing a caching distribution for the compressed library that may be performed by a Random Fractional Cache Encoder 302, in accordance with an example embodiment. The rate expression in Equation 1 (above) may be normalized to the file size, and may be independent of packet length b when $F \to \infty$. In the following, the $i^{th}$ packet of file $\overline{W}_f$, $f \in F$ may be denoted by $\overline{W}_{f,i}$.

FIG. 7 is a flowchart illustrating a compressed library placement phase that may be performed by the processor 158 of network element 151 that may cause the Random Fractional Cache Encoder 302 to perform these steps, in accordance with an example embodiment. In particular, the processor 158 may include a Random Fractional Module (RFM) 302a that may provide the processor 158 with the instructions to cause the processor 158 to command the encoder 302 to perform the method steps shown in FIG. 7. In step S600 of FIG. 7, the Random Fractional Cache Encoder 302 may receive the P files and I files computed by the Correlation-and-Popularity-Aware Library Compressor 300. Then, in step S602, the processor 158 may cause the Random Fractional Cache Encoder 302 to fill in the memory 156 (i.e., caches) of the destination devices 200 with properly chosen packets of inter-compressed files that were generated by Correlation-and-Popularity-Aware Library Compressor 300. In step S604, the processor 158 may perform the Random Fractional Caching algorithm (described below, in Algorithm 1), where each data file 'f' may be divided into $B_f = H(\overline{W}_f)/b \in \mathbb{N}$ packets of length b bits equal-size packets.

---

Algorithm 1: Random Fractional Caching algorithm 1 for $f \in F \to$
2     Each user u caches a subset of $p_{f,u} M_u B_f$ distinct packets of file f uniformly at random;

---

-continued

Algorithm 1: Random Fractional Caching algorithm 3 endfor
4     $C = \{C_{u,f}, \text{ with } u = 1,\ldots,n, \text{and } f = 1,\ldots,m\}$;
5 return(C);
end Caching algorithm

---

In Algorithm 1, $C_{u,f}$ denotes the set of packets stored at user u for file f and C the aggregate cache configuration.

In step S606, the processor 158 returns the computed cache to the configuration to all cache devices.

Example 2

Figure 8:
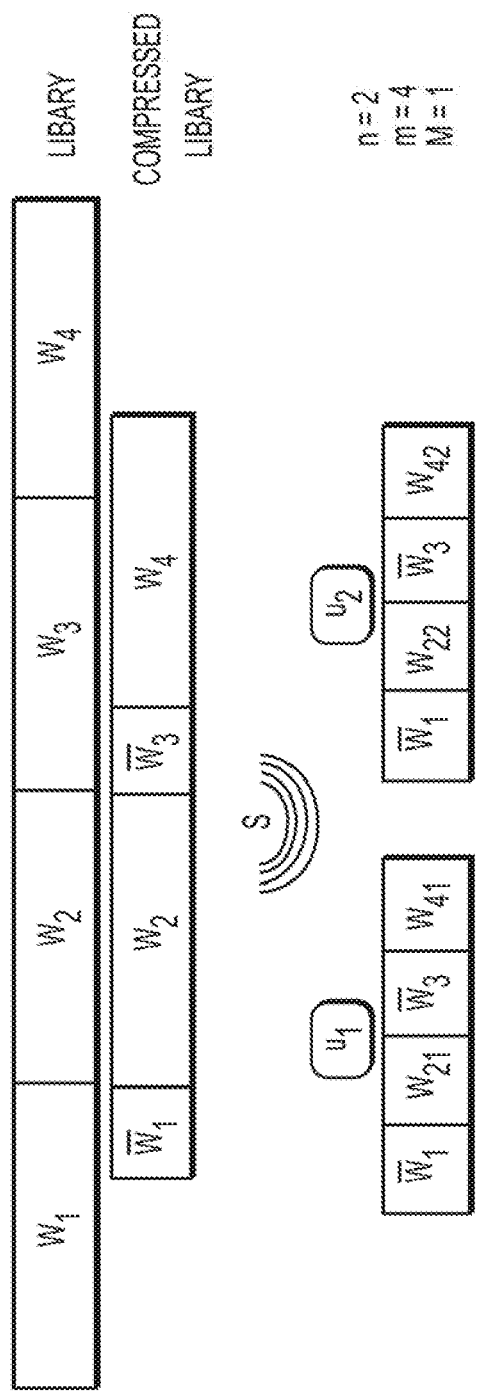
FIG. 8 illustrates an a user cache configuration resulting from a compressed library placement phase, in accordance with an example embodiment.

Based on Example 1 (above), it is further assumed (here) that the sender 151 may be connected to n=2 receivers $\{u_1,u_2\}$, each with a cache size M=1. For the compressed library $\{\overline{W}_1,\overline{W}_2,\overline{W}_3,\overline{W}_4\}$ described in Example 1, the packet length b=F/4 and a caching distribution $p_2=p_4=\frac{1}{4}$ and $p_1=p_3=1$ may be assumed. This may cause a splitting of files $\overline{W}_2$ and $\overline{W}_4$ into 4 packets, each with entropy F/4, and randomly storing 1 packet from each file at each receiver. Files $\overline{W}_1$ and $\overline{W}_3$ may comprise one packet each, and may both be stored in memory 156 (i.e., "cached") at the receivers 200. The packets $\{\overline{W}_1,\overline{W}_{21},\overline{W}_3,\overline{W}_{41}\}$ may be cached (stored in memory 156) at $u_1$, and $\{\overline{W}_1,\overline{W}_{22},\overline{W}_3,\overline{W}_{42}\}$ may be cached at $u_2$, as shown in FIG. 8.

Coded Multicast Encoder 400:

As described in Major Step 4, the processor 158 of sender 151 may cause the multicast encoder 400 to generate a coded multicast codeword that allows each destination device 200 to losslessly reconstruct a file that is requested by the device 200, given that the cached content and the resulting conflict graph may be composed of inter-compressed file pieces. Each destination device 200 may recover its demand using the multicast codeword and its cache content. The multicast codeword may be a linear combination of the packets needed by each destination device 200 for demand recovery. An objective may be to find the minimum multicast transmissions (termed as the multicast rate) for a given set of demands and the cache content of all destination devices 200. Such a problem may be formulated as the coloring of a corresponding conflict graph. However, the construction of the conflict graph may differ somewhat from the procedures described in these following patent documents which are hereby incorporated by reference in their entirety: U.S. pub. app. 2015/0207881, "Devices and Methods for Network-Coded and Caching-Aided Content Distribution," by Antonia Tulino, et al.; and U.S. pub. app. 2015/0207895, "Devices and Methods for Network-Coded and Caching-Aided Content Distribution," by Antonia Tulino, et al.; and U.S. pub. app. 2015/0207903, "Devices and Methods for Network-Coded and Caching-Aided Content Distribution," by Antonia Tulino. In particular, by modifying the formation of the conflict graphs (beyond what has been disclosed in these referenced patent applications above), each requested packet may correspond to a vertex in the conflict graph, where here the vertices may be composed of the following: 1) for each receiver 200 requesting an I-file, the uncached packets of the corresponding I-file, and 2) for each receiver 200 requesting a P-file, the uncached packets of the corresponding P-file and the uncached packets of the associated I-file. A directed edge between two vertices of the graph may mean that one receiver's 200 desired packet interferes with some other receiver's desired packet (i.e not cached at that receiver 200).

Figure 9:
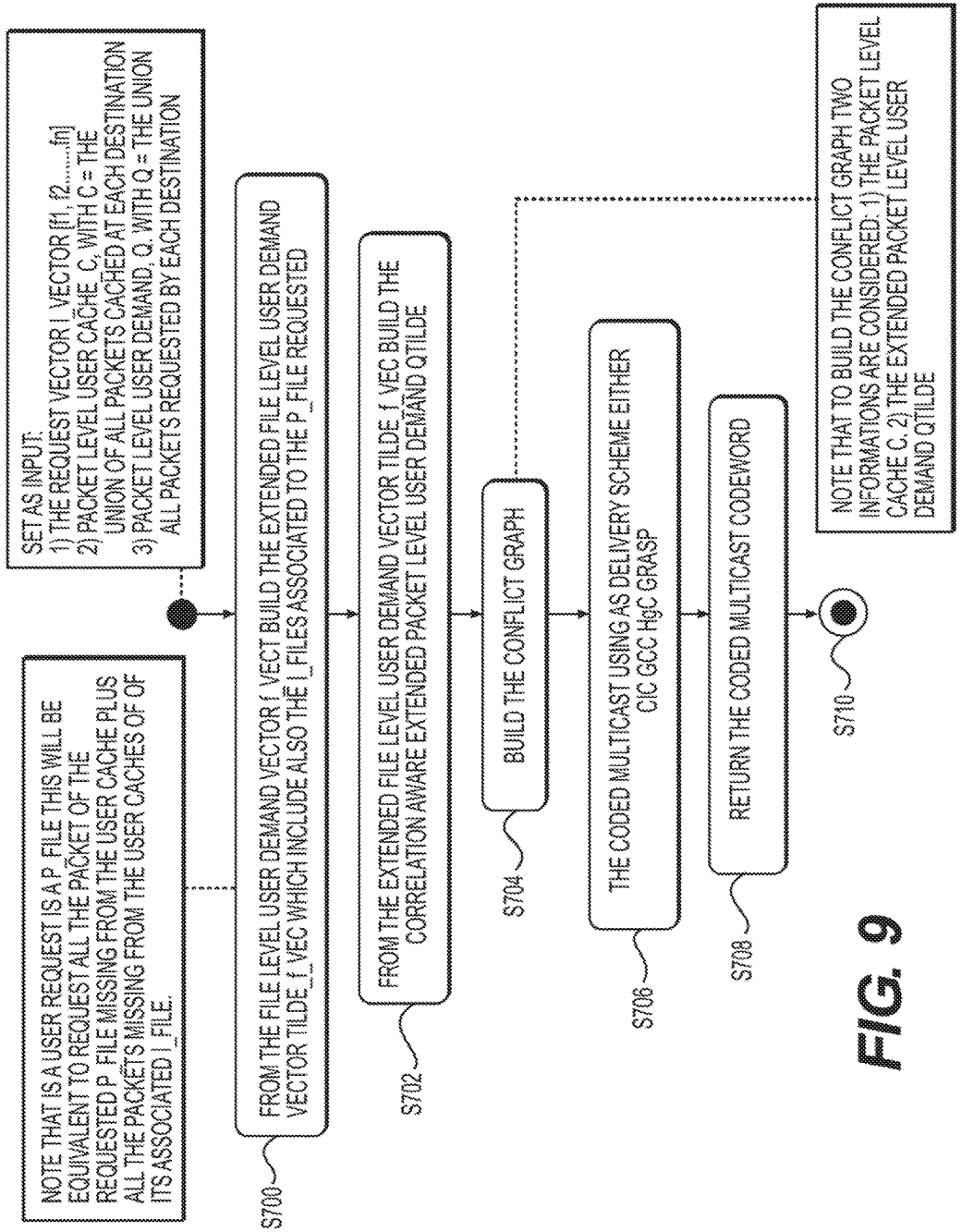
FIG. 9 is a flowchart illustrating a compressed library delivery phase, which may be performed by a Coded Multicast Encoder/Decoder.

FIG. 9 contains a flow chart of the steps followed by the multicast encoder 400 in order to build the multicast codeword, in accordance with an example embodiment. In particular, the processor 158 may include a Code Multicast Module (CMM) 400a that may provide the processor 158 with the instructions to cause the processor 158 to command the decoder 400 to perform the method steps shown in FIG. 9, described herein. In this method, in step S700, the processor 158 of network element 151 may receive the file level demand vector and may build the extended file level demand vector by including the I-file associated with each requested P-file, as computed by the library compressor 300. In step S702, the processor 158 may then further extend the file level user demand vector to build the extended packet level user demand by simply including all the packets of each file in the file level user demand vector into the packet level user demand. In step S704, the processor 158 may build a conflict graph (as disclosed in the following patent documents (also referenced above): U.S. pub. app. 2015/0207881, U.S. pub. app. 2015/0207895, and 2015/0207903) with user demand given by the computed extended user demand. In step S706, the processor 158 may build a coded multicast codeword resulting from a proper coloring of the conflict graph (e.g., using the CIC, GCC, HgC and/or GRASP coloring schemes described in the following patent documents 2015/0207881, 2015/0207895, 2015/0207903). In step S708, the processor 158 may return the computed coded multicast codeword. In step S710, the processor 158 may end the method.

Example 3

For the cache configuration given in Example 2, and demand realization f=(1,2), the processor 158 of the sender 200 may multicast $W_{21} \oplus W_{22}, W_{23}, W_{24}$, which may corresponds to a total rate of R=0.75. The transmitted codeword may enable the reconstruction of file $W_2$ at $u_1$ and with $\overline{W}_1$ being in its cache, receiver $u_1$ may be able to losslessly reconstruct $W_1$. Receiver $u_2$ may be able to reconstruct $W_2$ using the received packets. However, a correlation-unaware scheme (as disclosed in the above referenced patent documents: U.S. pub. app. 2015/0207881, and U.S. pub. app. 2015/0207896) would first need to compress the files separately and then cache $\frac{1}{4}^{th}$ of each file at each receiver 200, which may result in a total rate R=1.25 regardless of the demand realization.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:
1. A method of transmitting a plurality of data files in a network, comprising:
    receiving, by at least one processor of a network node, requests from destination devices for files of the plurality of data files;
    dividing, by the at least one processor, the files into one of a first subset of files, and a second subset of files, each of the files of the second subset of files being associated with one file of the first subset of files;
    compressing, by the at least one processor, each of the files of the second subset of files using one of the files in the first subset of files as a reference;
    dividing, by the at least one processor, the compressed files of the second subset of files and the files of the first subset into packets;
    caching, by the at least one processor, a portion of the compressed files of the second subset of files, and at least a portion of the files of the first subset of files;
    transmitting, by the at least one processor, un-cached portions of respective files from the first subset of files to respective destination devices that have requested these files; and
    transmitting, by the at least one processor, un-cached portions of one particular file from the second subset of files, and un-cached portions of files in the first subset of files that are associated with the one particular file, to respective destination devices that have requested the one particular file from the second subset of files.

2. The method of claim 1, wherein the dividing of the files into one of the first subset of files and the second subset of files includes,
    determining correlations between each of the files of the plurality of data files, the plurality of data files being contained in a file library;
    computing an aggregate popularity for each of the plurality of data files;
    selecting a first file, of the plurality of data files, with a highest aggregate popularity;
    assigning the first file to the first subset of files;
    assigning at least a second file, of the plurality of data files, to the second subset of files, the at least a second file being correlated with the first file;
    eliminating the first file and the at least a second file from the file library; and
    repeating the determining, computing, selecting, assigning and eliminating steps to assign successively lower aggregately popular files to the respective first subset of files and second subset of files.

3. The method of claim 2, wherein the compressing each of the files of the second subset of files using one of the files in the first subset as a reference includes,
    inter-compressing each of the files of the second subset of files using information on the aggregate popularity for each of the plurality of data files and a joint probability distribution of the plurality of files.

4. The method of claim 3, wherein the dividing of the compressed files of the second subset of files and the files of the first subset in packets includes ensuring that the packets are each equal in size.

5. The method of claim 4, wherein the transmitting steps further include,
    building a multicast codeword by,
        receiving a file level demand vector,
        building an extended file level demand vector that includes files of the first subset of files requested by the destination devices, the files of the second subset of files requested by the destination devices, and files of the first subset of files that are associated with the requested files of the second subset of files,
        building an extended packet level demand vector that includes un-cached portions of files contained in the extended file level demand vector,
        building a conflict graph including user demand represented by the extended file level user demand,
        coloring the conflict graph,
        building the multicast codeword using the colored conflict graph, and
    transmitting the respective un-cached files of the first and second subset of files using the multicast codeword.

6. The method of claim 1, wherein the at least one processor is a processor of a transmitter.

7. The method of claim 6, wherein the transmitter is a base station.

8. The method of claim 2, wherein the aggregate popularity includes a probability that a destination device requests a particular file of the plurality of files.

9. The method of claim 2, wherein the aggregate popularity includes a probability that a destination device requests at least one file correlated with the particular file.

10. A non-transitory computer-readable medium having a program including instructions for causing the at least one processor of the network node to perform the method of claim 1.

11. A device having a non-transitory computer-readable medium with a program including instructions for configuring at least one processor to perform a method of transmitting a plurality of data files in a network, the method comprising:
receiving, by the at least one processor, requests from destination devices for files of the plurality of data files;
dividing, by the at least one processor, the files into one of a first subset of files, and a second subset of files, each of the files of the second subset of files being associated with one file of the first subset of files;
compressing, by the at least one processor, each of the files of the second subset of files using one of the files in the first subset of files as a reference;
dividing, by the at least one processor, the compressed files of the second subset of files and the files of the first subset into packets;
caching, by the at least one processor, a portion of the compressed files of the second subset of files, and at least a portion of the files of the first subset of files;
transmitting, by the at least one processor, un-cached portions of respective files from the first subset of files to respective destination devices that have requested these files; and
transmitting, by the at least one processor, un-cached portions of one particular file from the second subset of files, and un-cached portions of files in the first subset of files that are associated with the one particular file, to respective destination devices that have requested the one particular file from the second subset of files.

12. A network node, comprising:
a processor configured to,
receive requests from destination devices for files of a plurality of data files,
divide the files into one of a first subset of files, and a second subset of files, each of the files of the second subset of files being associated with one file of the first subset of files,
compress each of the files of the second subset of files using one of the files in the first subset of files as a reference,
divide the compressed files of the second subset of files and the files of the first subset into packets,
cache a portion of the compressed files of the second subset of files, and at least a portion of the files of the first subset of files,
transmit un-cached portions of respective files from the first subset of files to respective destination devices that have requested these files, and
transmit un-cached portions of one particular file from the second subset of files, and un-cached portions of files in the first subset of files that are associated with the one particular file, to respective destination devices that have requested the one particular file from the second subset of files.

13. The network node of claim 12, wherein the dividing of the files into one of the first subset of files and the second subset of files is accomplished by the at least one being further configured to,
determine correlations between each of the files of the plurality of data files, the plurality of data files being contained in a file library,
compute an aggregate popularity for each of the plurality of data files,
select a first file, of the plurality of data files, with a highest aggregate popularity;
assign the first file to the first subset of files,
assign at least a second file, of the plurality of data files, to the second subset of files, the at least a second file being correlated with the first file,
eliminate the first file and the at least a second file from the file library, and
repeat the determining, computing, selecting, assigning and eliminating steps to assign successively lower aggregately popular files to the respective first subset of files and second subset of files.

14. The network node of claim 13, wherein the compressing each of the files of the second subset of files using one of the files in the first subset as a reference is accomplished by the at least one processor being further configured to,
inter-compress each of the files of the second subset of files using information on the aggregate popularity for each of the plurality of data files and a joint probability distribution of the plurality of files.

15. The network node of claim 14, wherein the dividing of the compressed files of the second subset of files and the files of the first subset in packets includes the at least one processor being further configured to ensure that the packets are each equal in size.

16. The network node of claim 15, wherein the transmitting steps are accomplished by the at least one processor being further configured to,
build a multicast codeword by,
receive a file level demand vector,
build an extended file level demand vector that includes files of the first subset of files requested by the destination devices, the files of the second subset of files requested by the destination devices, and files of the first subset of files that are associated with the requested files of the second subset of files,
build an extended packet level demand vector that includes un-cached portions of files contained in the extended file level demand vector,
build a conflict graph including user demand represented by the extended file level user demand,
color the conflict graph,
build the multicast codeword using the colored conflict graph, and
transmit the respective un-cached files of the first and second subset of files using the multicast codeword.

17. The network node of claim 12, wherein the at least one processor is a processor of a transmitter.

18. The network node of claim 17, wherein the transmitter is a base station.

19. The network node of claim 13, wherein the aggregate popularity includes a probability that a destination device requests a particular file of the plurality of files.

20. The network node of claim 13, wherein the aggregate popularity includes a probability that a destination device requests at least one file correlated with the particular file.

* * * * *